United States Patent [19]
Keller et al.

[11] 4,098,450
[45] Jul. 4, 1978

[54] SUPERALLOY ARTICLE CLEANING AND REPAIR METHOD

[75] Inventors: Donald L. Keller, Cincinnati; David L. Resor, Mount Orab, both of Ohio

[73] Assignee: General Electric Company, Cincinnati, Ohio

[21] Appl. No.: 778,493

[22] Filed: Mar. 17, 1977

[51] Int. Cl.² .................................... B23K 31/00
[52] U.S. Cl. ........................... 228/119; 29/402; 164/92; 228/193; 228/220; 228/221; 228/248
[58] Field of Search ............. 228/119, 206, 219, 220, 228/221, 248, 193, 195; 29/402; 164/92

[56] References Cited
U.S. PATENT DOCUMENTS

| 3,246,392 | 4/1966 | Altgelt | 228/119 X |
| 3,758,347 | 9/1973 | Stalker | 148/4 |
| 4,008,844 | 2/1977 | Duvall | 228/119 |
| 4,019,014 | 4/1977 | Byrne | 228/119 X |
| 4,028,787 | 6/1977 | Cretella | 228/119 X |

OTHER PUBLICATIONS

Brazing in Reducing Fluoride-Containing Atmosphere; E. Genieys, (Brit. Assn. for Brazing), Nov. 1972.

*Primary Examiner*—Donald G. Kelly
*Attorney, Agent, or Firm*—Lee H. Sachs; Derek P. Lawrence

[57] ABSTRACT

A narrow crevice in a Ni-base superalloy article is repaired by first removal of a complex oxide of at least one metal selected from Al and Ti, by treatment of the oxide in the crevice with gaseous active fluoride ions in a non-oxidizing atmosphere at a temperature at which the oxide will react with the fluoride ions under the conditions around the oxide. The crevice is then repaired in a subsequent step such as by filling with metal or pressure bonding.

6 Claims, 4 Drawing Figures

U.S. Patent
July 4, 1978
4,098,450
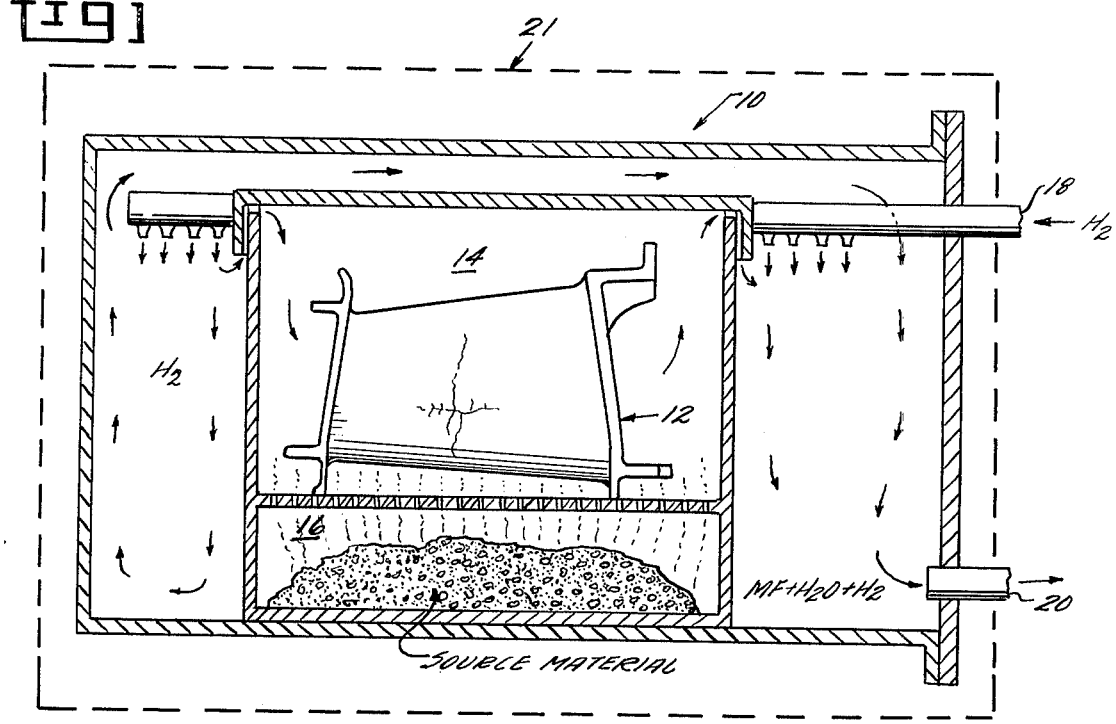
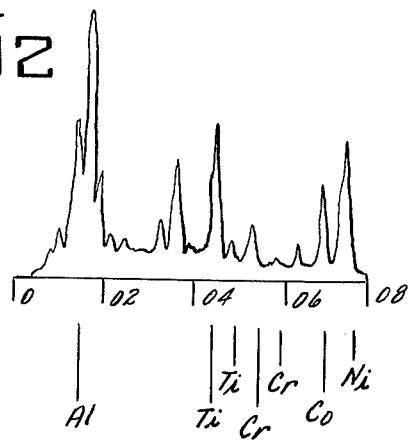
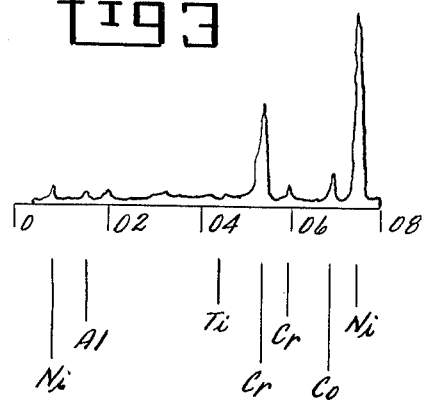
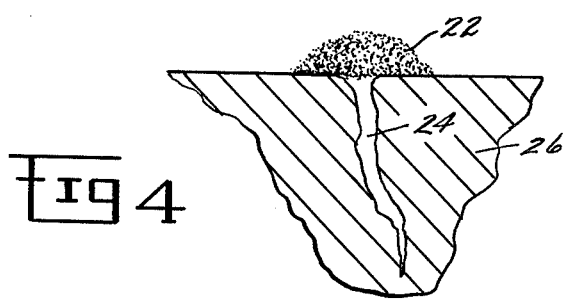

SUPERALLOY ARTICLE CLEANING AND REPAIR METHOD

The invention herein described was made in the course of or under a contract, or a subcontract thereunder, with the United States Department of the Air Force.

FIELD OF THE INVENTION

This invention relates to repair and overhaul of Ni-base superalloy articles and, more particularly, to the cleaning of oxides from, followed by the repairing of, crevices in Ni-base superalloy articles.

BACKGROUND OF THE INVENTION

During operation of such apparatus as gas turbine engines, some of the components can experience damage such as might result from foreign objects impacting on the component, normal fatigue based on the cyclic life of the material from which the component is made, etc. In the higher temperature operating portions of such apparatus, there are included airfoil components such as turbine blades and vanes which are expensive to replace and sometimes costly to repair. For example, a crack occurring in such engine airfoils can generate surface oxides in the crack because of the high temperature operation under oxidizing conditions.

In the case of nickel-base superalloys which include the element Al and generally the element Ti, the creation of complex oxides including one or both of Al and Ti along with other elements of the superalloy from which such article is made, presents a difficult crack healing problem: the oxide must be removed in order to repair satisfactorily the crevice or crack. Such oxides are impractical to remove solely through exposure to a reducing atmosphere without exposing the superalloy article to temperatures detrimental to its mechanical properties or to its structural integrity. Therefore, such repairs have sometimes been made by benching out or cutting away and replacing the damaged portion of the component.

SUMMARY OF THE INVENTION

It is a principal object of the present invention to provide a method for removing from a narrow crevice in a Ni-base superalloy article the complex oxide which can form under high temperature oxidizing operating conditions and then repairing such an article after oxide removal.

This and other objects and advantages will be more fully understood from the following detailed description, the drawing and the examples, all of which are intended to be typical of rather than in any way limiting on the scope of the present invention.

Briefly, the method of the present invention includes providing a non-oxidizing atmosphere about a Ni-base superalloy article including a narrow crevice, having an opening in the range of about 0.001 to about 0.1 inch, to be cleaned of a complex oxide, and then exposing such crevice to gaseous active fluoride ions while heating the oxide at a temperature no greater than about 2000° F (about 1100° C) to enable the oxide to react with the fluoride ions under such conditions to convert the oxide to a gaseous fluoride without intergranular attack. Thereafter, the cleaned crevice is repaired, such as by placing over the crevice a repair or healing alloy in powder form, placing the article in a vacuum and then heating the article to melt the repair alloy and to flow the repair alloy into and wet the walls of the crevice. In another form the repair step of the present invention includes applying over the opening of the crevice at the surface of the article a pressure barrier and then applying a combinaton of heat and isostatic pressure to the article in an amount and for a time sufficient to press together and diffusion bond walls of the crevice.

BRIEF DESCRIPTION OF THE DRAWING

FIG. 1 is a diagrammatic view of a retort useful in practicing a form of the present invention;

FIG. 2 is a graphical view of a Scanning Electron Microscope (SEM) scan of a typical crack surface before cleaning;

FIG. 3 is a graphical view of an SEM scan of a typical crack surface after gaseous active fluoride ion cleaning according to the present invention; and FIG. 4 is a fragmentary, diagrammatic sectional view of a crack in a superalloy surface over which has been placed a repair alloy.

DESCRIPTION OF A PREFERRED EMBODIMENT

In the operation and maintenance of aircraft gas turbine engines, there are many potential benefits which may be accrued by repair rather than replacement of engine airfoils, for example those in the hotter, turbine section of the engine. Such parts which have become non-serviceable through operation, for example from foreign object damage, can have a large percentage of service life remaining. Thus, such damaged airfoils may, by repetitive repair, attain several times the normal replacement life. Such a utilization to near full design life provides a material conservation and a significant cost advantage over replacement of such components.

In the case of aircraft gas turbine engine airfoils, cracking has affected such areas as leading and trailing edges, tip, platform and bands. The repairability of such narrow, close tolerance cracks is severely hampered by such deposits as the complex, tenacious oxides formed on the turbine airfoils which are manufactured from such superalloys as the nickel-base superalloys. Because such superalloys include elements such as Al and Ti, the products of oxidation generally are complex oxides including at least one of such elements and are particularly stable to currently known deoxidation procedures conducted at temperatures below that at which the mechanical properties of the alloy of the article will be affected detrimentally. For example, attempts to reduce such complex oxides in reducing hydrogen furnaces at temperatures less than about 2000° F. have been unsuccessful.

Furnaces with hydrogen atmospheres are used extensively to reduce the surface oxides of Fe, Ni, Co and Cr which can occur during oxidation exposure of common steels and simple Co- and Ni-base alloys. Therefore, such relatively simple alloys are routinely cleaned in hydrogen furnaces by a method sometimes referred to as "bright annealing". However, a thermodynamic analysis shows that the reduction of oxides of Al and Ti requires temperatures and hydrogen purities currently unavailable in commercial hydrogen furnaces, vacuum furnaces or with commercial fluxes. For this reason, conventional repair of articles made from Ni-base superalloys has involved tedious and expensive mechanical removal of cracks, such as by grinding, for repair welding. Because oxides are present in narrow cracks or crevices, molten repair metal cannot wet walls of and flow into narrow crevices in the range of about 0.001 - 0.01 inch. There has been reported in a paper, "Brazing in reducing fluoride-containing atmospheres" by E. Genieys, before The British Association for Brazing and Soldering, First International Brazing and Soldering Conference in London, England, 27–29 November 1972, a method for reducing certain oxides through exposure to reducing fluoride atmospheres along with the concurrent brazing of members to be joined. The disclosure of that paper is incorporated herein by reference.

The method of the present invention removes complex oxides from crevices in service operated Ni-base alloy articles by first exposing them, prior to repair, to gaseous active fluoride ions at temperatures less than that which would detrimentally affect the mechanical properties and structural integrity, no greater than about 2000° F, in a nonoxidizing atmosphere. Because the repair method of the present invention provides a gaseous active fluoride ion which can penetrate the narrow crevices, which herein is intended to include cracks and other difficult-to-reach, close tolerance depressions in an article surface having an opening at the surface in the range of about 0.001 - 0.1 inch, the need for tedious and expensive hand operations have been eliminated: the first method step, being gaseous, removes such oxides from the inside surfaces of cracks, cooling holes, etc. Such oxide removal has been confirmed by metallography, as well as Scanning Electron Microscope (SEM) analysis of crack surfaces before and after cleaning, as will be discussed later. In addition, such evaluations have confirmed the benefit of that form of the repair method associated with the present invention in which a repair or healing alloy is flowed into cleaned cracks in a vacuum.

The method of the present invention can be practiced using relatively simple heat-treatment equipment such as a hydrogen atmosphere retort in an air furnace. Such an apparatus is shown in the diagrammatic presentation of FIG. 1 wherein the retort is shown generally at 10. An article such as turbine vane 12 is placed in a processing chamber 14 of the retort. Communicating with such processing chamber is a fluoride ion source material chamber 16 which provides for flow of gaseous active fluoride ions into processing chamber 14. Although this particular embodiment is shown in FIG. 1, it will be readily recognized by those skilled in the art that any means can be used to provide gaseous fluoride ions to processing chamber 14 into contact with vane 12. A reducing atmosphere, in this case hydrogen gas, is provided about chambers 14 and 16, enabling hydrogen gas to flow, according to the arrows shown in FIG. 1, through chambers 14 and 16. For example, $H_2$ gas is introduced into inlet 18 which cooperates with gas outlet 20 to provide for a flow of $H_2$ into the retort and the flow of such gas and the products of reaction from the retort through outlet 20. When placed in a furnace, represented by broken line 21, heat is applied through walls of the retort into chambers 14 and 16.

In a typical example using the apparatus shown in FIG. 1, a turbine vane of a nickel-base superalloy commercially available as Rene' 80 alloy and described in U.S. Pat. No. 3,615,376 — Ross, the disclosure of which is incorporated herein by reference, was placed within the retort for the removal of complex oxides which had formed in a crack in the airfoil. Included in the composition of such an alloy are, nominally by weight, 3% Al and 5% Ti which together with such elements as Cr, Co and Ni can form tenacious and complex oxides. In this example, the fluoride ion source material was $CrF_3$ + 3.5 $H_2O$ which, upon heating in hydrogen gas, reacts to produce HF, the source of the gaseous active fluoride ion. However, it should be understood that other forms of fluoride of Cr can be used in this specific example. According to the method of the present invention, the application of heat must be maintained no greater than about 2000° F in the presence of the active fluoride ions. It has been found that above that temperature, the fluoride ions preferentially attack Ni-base superalloy grain boundaries resulting in alloy structural damage. It is preferred that such heat be applied in the range of about 1600°–2000° F (about 870°–1100° C) for a period from about ¼ to 4 hours. In this particular example, the temperature was in the range of about 1600°–1800° F (about 870°–985° C) for about 1-2 hours. During that period, the complex oxides within the crack of the Rene' 80 alloy article were removed.

Examination of the cracked surfaces before and after cleaning was conducted on the SEM apparatus. Typical crack appearances and chemical compositions, as evaluated on the SEM, are shown in the graphical presentations of FIGS. 2 and 3. FIG. 2 is an SEM scan of a typical Rene' 80 alloy crack surface before cleaning, showing the relatively high Al and Ti content resulting from the presence of complex oxides including those elements. For comparison purposes, FIG. 3 presents a graphical view of an SEM scan of a typical Rene' 80 alloy crack surface after fluoride ion cleaning according to the present invention. It will be noted that the relatively large amounts of Al and Ti have been removed from the surface. Narrow cracks with openings as small as 0.001 inch at the surface and having walls tapering to a point a distance of at least about 0.050 inch within the surface have been cleaned of oxides through practice of the method of the present invention. Thus, the present invention includes a practical method for removing complex oxides from surfaces within narrow cracks in superalloys of the nickel-base type currently in use in the turbine section of many gas turbine engines.

Another aspect of the present invention is the repair of a crack in a superalloy article after cleaning as described above. One repair procedure which has been evaluated in connection with the present invention involves placement of a healing alloy over the crack after cleaning. Such an arrangement is shown in the fragmentary diagrammatic view of FIG. 4 wherein a powdered healing alloy 22 is placed over cleaned crevice 24 in substrate alloy 26. For example, in one evaluation, a crevice 24 in Rene' 80 nickel-base superalloy 26 was repaired using a powdered healing alloy 22 sometimes referred to as D-15 alloy and described in U.S. Pat. No. 3,759,692 — Zelahy, the disclosure of which is incorporated herein by reference. Nominally, the alloy consisted essentially of, by weight, 15% Cr, 10% Co, 3% Al, 3% Ta, 2.5% B with the balance Ni. In this example, the article including the crevice shown in FIG. 4, with the powdered healing alloy placed over the crevice opening, was placed in a vacuum furnace. It was first subjected to a high vacuum, for example of about $10^{-5}$ Torr, during which time any atmosphere, such as air, was removed from crevice 24 as well as from other portions of the vacuum chamber. Then the article and healing alloy powder were subjected to a temperature sufficiently high to melt healing alloy 22 in FIG. 4, to allow it, under the vacuum conditions, to wet walls and flow into crevice 24 thereby sealing it, and to diffuse it with substrate 26. In this way, diffusion healing of the cleaned crack was accomplished. In this example using D-15 alloy with a Rene'80 alloy substrate, a temperature of about 2200° F, a temperature below the incipient melting point of the alloy being repaired, was used successfully. Examination of the microstructure within and adjacent to the crack area after processing in this manner showed complete wetting and filling of the crack by the healing alloy. Engine testing of turbine vanes repaired as described above has shown that such repair provides vanes with additional useful life.

Another method available for repair of a surface-connected crack, cleaned using active, gaseous fluoride ions as described above, employs a process sometimes referred to as hot isostatic pressing (HIP). As is described in U.S. Pat. No. 3,758,347 — Stalker, the disclosure of which is incorporated herein by reference, surface-connected discontinuities in an article can be repaired by first bridging surface openings of such discontinuities sufficient to prevent penetration of a subsequently applied pressurizing fluid such as a gas. Then heat is applied in combination with pressure through the fluid, uniformly to the article, sufficient to cause creep in the metal of the article at the temperature of heating. The article is held under these conditions of temperature and pressure for a time sufficient to press together and diffusion bond walls of the discontinuity, such as a crack or crevice.

During evaluation of the present invention, an attempt was made to repair a crack in gas turbine engine components made of a cobalt-base alloy sometimes referred to as X-40 alloy. In composition, such alloy consists nominally, by weight, of 25% Cr, 2% Fe, 10.5% Ni, 7.5% W, with the balance Co. After exposure to gaseous active fluoride ions, according to the present invention described above, attack was noted on the grain boundary matrix around the carbides in the grain boundaries. Such attack was experienced at several temperatures in the range of about 1700° to 1950° F. (about 927° – 1066° C) and is believed to be related to low Cr content at that point and the absence of one or more of the elements Al and Ti, present in the Ni-base superalloys with which the present invention is associated.

The present invention provides an improved method for removing complex oxides from within a narrow crevice in a nickel-base superalloy article through the application of gaseous active fluoride ions in a non-oxidizing atmosphere and then repairing such cleaned crevice. One form of repair includes flowing a healing-type alloy into the crevice under vacuum and them allowing such alloy to wet and diffuse with walls of the crevice. Another repair form includes hot isostatically pressing walls of the cleaned crevice together. Although the present invention has been described in connection with specific embodiments and examples, it will be recognized by those skilled in the art the various modifications and variations of which the present invention is capable without departing from its scope.

What is claimed is:

1. A method for repairing a narrow crevice in the surface of a Ni-base superalloy article, the crevice having an opening at the surface in the range of about 0.001 – 0.1 inch and including a complex oxide which includes at least one metal selected from the group consisting of Al and Ti, comprising the steps of:
   providing a non-oxidizing atmosphere about the oxide;
   contacting the oxide with gaseous active fluoride ions while heating the oxide at a temperature no greater than about 2000° F and at which the oxide will react with the fluoride ions to convert the oxide to a gaseous fluoride, without substantially affecting detrimentally the structure and mechanical properties of the article;
   applying a powdered repair alloy which melts and flows at a temperature less than that which will affect detrimentally mechanical properties of the article on the article surface over the crevice;
   providing a vacuum about the article; and then
   heating the article and repair alloy at temperature less than that which will affect detrimentally the mechanical properties of the article for a time sufficient to melt the bonding alloy and to flow the repair alloy into the crevice to fill the crevice and to diffuse the repair alloy with walls of the crevice.

2. The method of claim 1 in which the oxide and the fluoride ions are heated at a temperature in the range of about 1600° – 2000° F for about ¼ – 4 hours to convert the oxide to a gaseous fluoride.

3. The method of claim 2 in which the heating is conducted in the range of about 1600° – 1800° F for about ½ – 2 hours.

4. A method for repairing a narrow crevice in the surface of a Ni-base superalloy article, the crevice having an opening at the surface in the range of about 0.001 – 0.1 inch and including a complex oxide which includes at least one metal selected from the group consisting of Al and Ti, comprising the steps of:
   providing a non-oxidizing atmosphere about the oxide;
   contacting the oxide with gaseous active fluoride ions while heating the oxide at a temperature no greater than about 2000° F and at which the oxide will react with the fluoride ions to convert the oxide to a gaseous fluoride, without substantially affecting detrimentally the structure and mechanical properties of the article;
   providing at the article surface over the crevice a pressure barrier which will prohibit fluid flow into the crevice; and then
   diffusion bonding walls of the crevice by the hot isostatic pressing method.

5. The method of claim 4 in which the oxide and the fluoride ions are heated at a temperature in the range of about 1600° – 2000° F for about ¼ – 4 hours to convert the oxide to a gaseous fluoride.

6. The method of claim 5 in which the heating is conducted in the range of about 1600° – 1800° F for about ½ – 2 hours.

* * * * *